(12) United States Patent
Zalio

(10) Patent No.: US 7,561,543 B2
(45) Date of Patent: Jul. 14, 2009

(54) CELL SEARCH PROCESS FOR WIRELESS COMMUNICATION SYSTEM

(75) Inventor: Filip Zalio, Glen Waverley (AU)

(73) Assignee: NEC Corporation, Tokyo (JP)

( * ) Notice: Subject to any disclaimer, the term of this patent is extended or adjusted under 35 U.S.C. 154(b) by 164 days.

(21) Appl. No.: 10/592,310

(22) PCT Filed: Mar. 16, 2005

(86) PCT No.: PCT/JP2005/004614

§ 371 (c)(1), (2), (4) Date: Sep. 11, 2006

(87) PCT Pub. No.: WO2005/088855

PCT Pub. Date: Sep. 22, 2005

(65) Prior Publication Data

US 2007/0177535 A1    Aug. 2, 2007

(30) Foreign Application Priority Data

Mar. 16, 2004  (AU) ............................. 2004901383
Feb. 11, 2005  (AU) ............................. 2005200628

(51) Int. Cl.
*H04W 4/00*    (2006.01)
(52) U.S. Cl. .................. 370/328; 370/335; 370/350
(58) Field of Classification Search ......... 370/234–350; 455/411–458; 375/148
See application file for complete search history.

(56) References Cited

U.S. PATENT DOCUMENTS

| | | | | |
|---|---|---|---|---|
| 5,867,489 A | * | 2/1999 | Hershey et al. | 370/324 |
| 6,894,995 B2 | * | 5/2005 | Chitrapu et al. | 370/335 |
| 6,954,485 B1 | | 10/2005 | Hashimoto et al. | |
| 2002/0024942 A1 | * | 2/2002 | Tsuneki et al. | 370/335 |
| 2002/0110185 A1 | | 8/2002 | Ohnishi | |
| 2003/0076801 A1 | | 4/2003 | Aikawa et al. | |
| 2005/0111528 A1 | * | 5/2005 | Fulghum et al. | 375/148 |

FOREIGN PATENT DOCUMENTS

| | | |
|---|---|---|
| JP | 2001-119321 A | 4/2001 |
| JP | 2002-141886 A | 5/2002 |
| JP | 2002-185365 A | 6/2002 |
| JP | 2004-266312 A | 9/2004 |

OTHER PUBLICATIONS http://www.umtsworld.com/technology/compressed.htm☐☐Compressed Mode☐☐Copyright 1999-2003 UMTSWorld.com.*

* cited by examiner

*Primary Examiner*—Nick Corsaro
*Assistant Examiner*—Kathy Wang-Hurst
(74) *Attorney, Agent, or Firm*—Foley & Lardner LLP

(57) ABSTRACT

A method of performing a continuous cell search for new cells in a wireless communication systems having a plurality of base stations and a mobile station, the method including the steps of: (a) using (1) a primary synchronization code to acquire slot synchronization for identified cells; (b) using (2) a secondary synchronization code to find frame synchronization and identify a code group of the identified cells; (c) determining (3) a primary scrambling code used by the identified cells; and (d) rejecting (4) cells corresponding to previously identified primary scrambling codes from post-processing, wherein the method further includes the steps of: (e) correlating slot timings identified in step (a) with frame timings corresponding to primary scrambling codes identified in previous runs of steps (b) and (c); and (f) rejecting slot timings identified in step (a) from further processing in steps (b) and (c) when correlation is detected.

6 Claims, 6 Drawing Sheets

CELL SEARCH PROCESS FOR WIRELESS COMMUNICATION SYSTEM

BACKGROUND OF THE INVENTION

1. Field of the Invention

The present invention relates generally to wireless communication systems having a plurality of base stations and a mobile station, and in particular to the cell search process performed by the mobile station. The present invention is suitable for use in spread spectrum systems, and in particular in wide band code division multiple access (W-CDMA) systems, and it will be convenient to describe the invention in relation to that exemplary, non-limiting application.

2. Description of the Related Art

In W-CDMA and like wireless communication systems, a mobile station can receive a number of radio signals transmitted from several base stations, each radio signal serving a separate cell within a service area, via multiple propagation paths. A cell search process is carried out by the mobile station to synchronize the mobile station with a base station of a cell prior to transmission of traffic data, such as voice data.

A standard cell search process is shown in FIG. 1 and includes a slot synchronization step 1, a code-group identification and frame synchronization step 2, and long scrambling code identification step 3. During slot synchronization, the mobile station uses a primary synchronization code continuously transmitted in a primary synchronization channel to acquire slot synchronization to a cell. Slot synchronization is typically performed with a single matched filter or similar device matched to the primary synchronization code which is common to all cells. The slot timing of the cell can be obtained by detecting peaks in the matched filter output.

During the second step of the cell search procedure, the mobile station uses the synchronization channel's secondary synchronization code to find frame synchronization and identify the code group of the cell found in the slot synchronization step. This is done by correlating the received signal with all possible secondary synchronization code sequences, and identifying a maximum correlation value. Since the cyclic shifts of the sequences are unique, the code group as well as the frame synchronization is determined.

During the third step of the cell search procedure, the mobile station determines the exact primary scrambling code used by the found cell. The primary scrambling code is typically identified through symbol-by-symbol correlation over the Common Pilot Channel (CPICH) with all codes within the code group identified in the second step.

Having now identified the primary scrambling code used by the found cell, the identified primary scrambling code is compared in step 4 with a list 5 of previously identified scrambling codes in order to remove cells that have already been identified via the standard cell search process. Only those candidate cells for which the identified primary scrambling code is not found in the list 5 are then handled in subsequent post-processing operations.

When a mobile station performs a continuous cell search for the purpose of identifying new cells as they appear, the standard algorithm is to handle peaks detected in the first step of the cell search by comparing the timing of the peaks with peaks acquired in the previous run of the first cell search step. New peaks that have timing "very close" to the old peaks detected in previous runs of the cell search process are considered to be identical, and are rejected from further processing. Whether peaks are "very close" or not is determined by a dynamically adjusted parameter defining a maximum possible timing difference for which the peaks can are considered identical. The value of this parameter is derived from the maximum derived drift due to automatic frequency control (AFC) error and the moving path timing and current parameters of compressed mode.

The above-described standard cell search procedure dose not perform well when the first step is run within compressed mode gaps, that is when the peaks are far apart from each other, and also in idle mode when the paging occasions are frequently far apart. In this situation, the peak timing positions from subsequent first step runs frequently differ by a large amount. Accordingly, there is no information to identify which first step peaks belong to previously identified cells. The worst case outcome is that a first step peak belonging to the same cell is analyzed repeatedly with second and third steps because it keeps drifting out of the pre-set window. In such a scenario, the peak is repeatedly rejected after the third step as a multi-path signal and a new cell may therefore never be identified.

SUMMARY OF THE INVENTION

It would therefore be desirable to provide a cell search process that ameliorates or overcomes one or more disadvantages of known cell search processes carried out by mobile stations in wireless communication systems.

It would also be desirable to provide a cell search process that exhibits improved performance in situations where slot timings of detected cells vary greatly, such as in WCDMA compressed mode operation and when paging occasions are far apart.

One aspect of the invention provides a method of performing a continuous cell search for new cells in a wireless communication systems having a plurality of base stations and a mobile station, the method including the steps of: (a) using a primary synchronization code to acquire slot synchronization for identified cells; (b) using a secondary synchronization code to find frame synchronization and identify a code group of the identified cells; (c) determining a primary scrambling code used by the identified cells; and (d) rejecting cells corresponding to previously identified primary scrambling codes from post-processing, wherein the method further includes the steps of: (e) correlating slot timings identified in step (a) with frame timings corresponding to primary scrambling codes identified in previous runs of steps (b) and (c); and (f) rejecting slot timings identified in step (a) from further processing in steps (b) and (c) when correlation detected.

A method including these steps achieves faster cell searching due by avoiding processing the same first step peaks two or more times, due to highly variable timing caused notably by moving multi-path signals or the Doppler effect. Faster cell searching is also achieved due to rejection of step one peaks from at least some previously cells at an early stage in the cell searching process, without always having to re-run the lengthy second cell searching step, since similar peak timing alone is not relied upon.

The time taken by inter-frequency searching is shortened for new cells during compressed mode with sparsely distributed gaps, therefore improving the overall system performance. Cell search performance is also improved in idle mode, because the timing drift effect between paging occasions is similar to compressed mode.

In one embodiment of the invention, step (f) is performed on slot timings determined to have the strongest correlation in step (e).

The slot timings having the strongest correlation in step (e) may be determined by dividing by strength of correlation of each slot timing by the average of all slot timings detected to derive a slot timing signal-to-noise ratio, and comparing the ratio to the predetermined threshold.

Signal-to-noise rations exceeding the predetermined threshold may be rejected in step (f).

The correlation performed in step (e) may be performed over a limited number of W-CDMA slots.

The correlation performed in step (e) may be performed within the same compressed mode window or paging occasion.

Another aspect of the invention provides a mobile station for use in a wireless communication system including a plurality of base stations, the mobile station including: a slot timing detector; a frame timing and code-group detector; and a scrambling code detector, the mobile station further including a correlator device for correlating slot timings identified by the slot timing detector with frame timings corresponding to primary scrambling codes identified by the frame timing and code groups detector and the scrambling code detector in previous cell search runs.

The correlator device may include a plurality of individual correlators connected parallel, each correlator being set up for a different scrambling code to detect a plurality of known scrambling codes in a single step.

The correlator device may include a matrix of individual correlators, each row of correlators in the matrix being set up for timing of a plurality of multi-path reflections corresponding to a given scrambling code.

The following description refers in more detail to the various features of the present invention. To facilitate an understanding of the invention, reference is made in the description to the accompanying drawing where the cell search method and mobile station for carrying out the cell search method are illustrated in a preferred embodiment. It is to be understood however that the invention is not limited to the preferred embodiment illustrated in the drawings.

DESCRIPTION OF THE PREFERRED EMBODIMENTS

Figure 1:
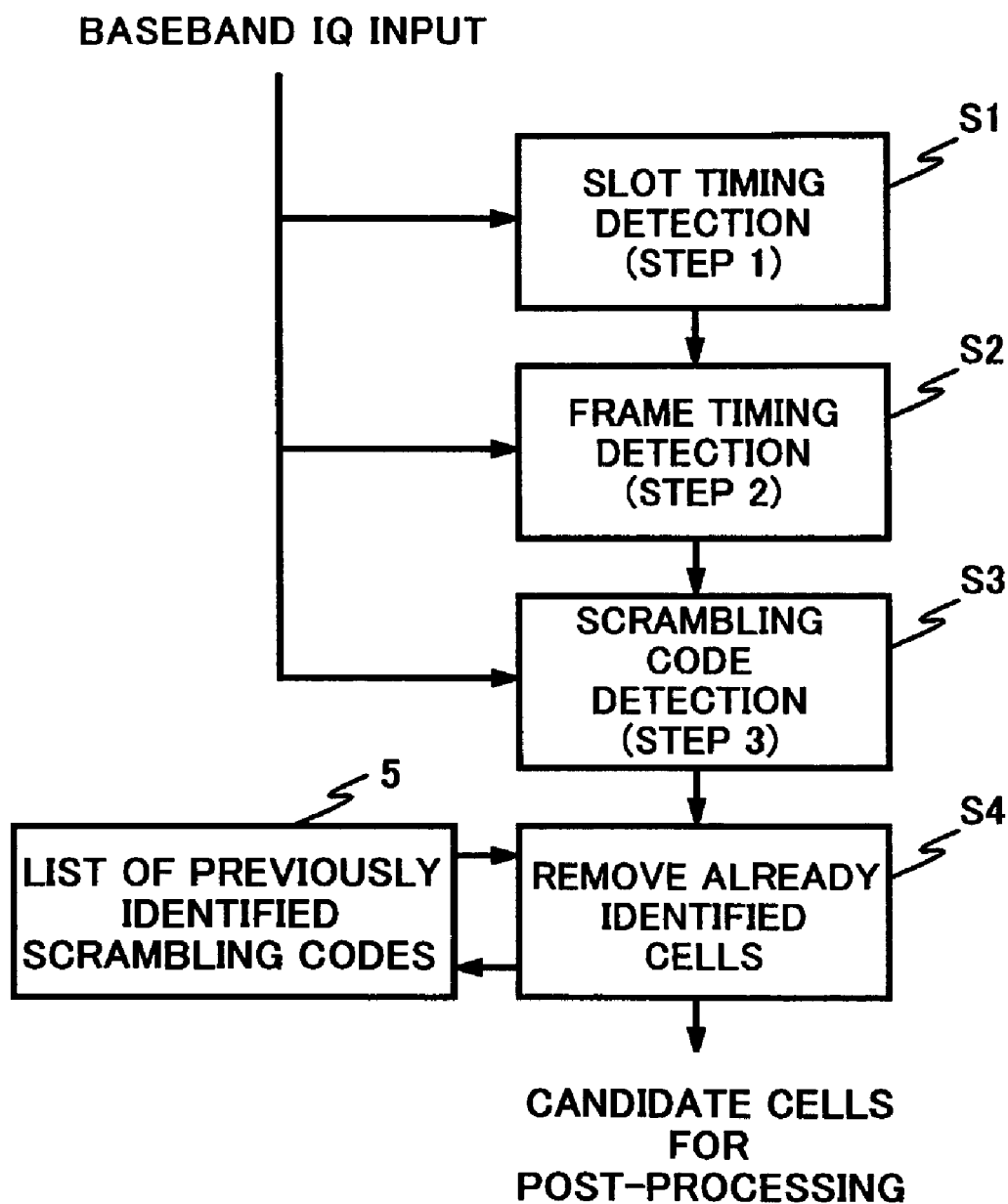
FIG. 1 is a flow chart illustrating the broad functional steps performed by a W-CDMA mobile station when carrying out a cell search in accordance with the prior art.
Figure 2:
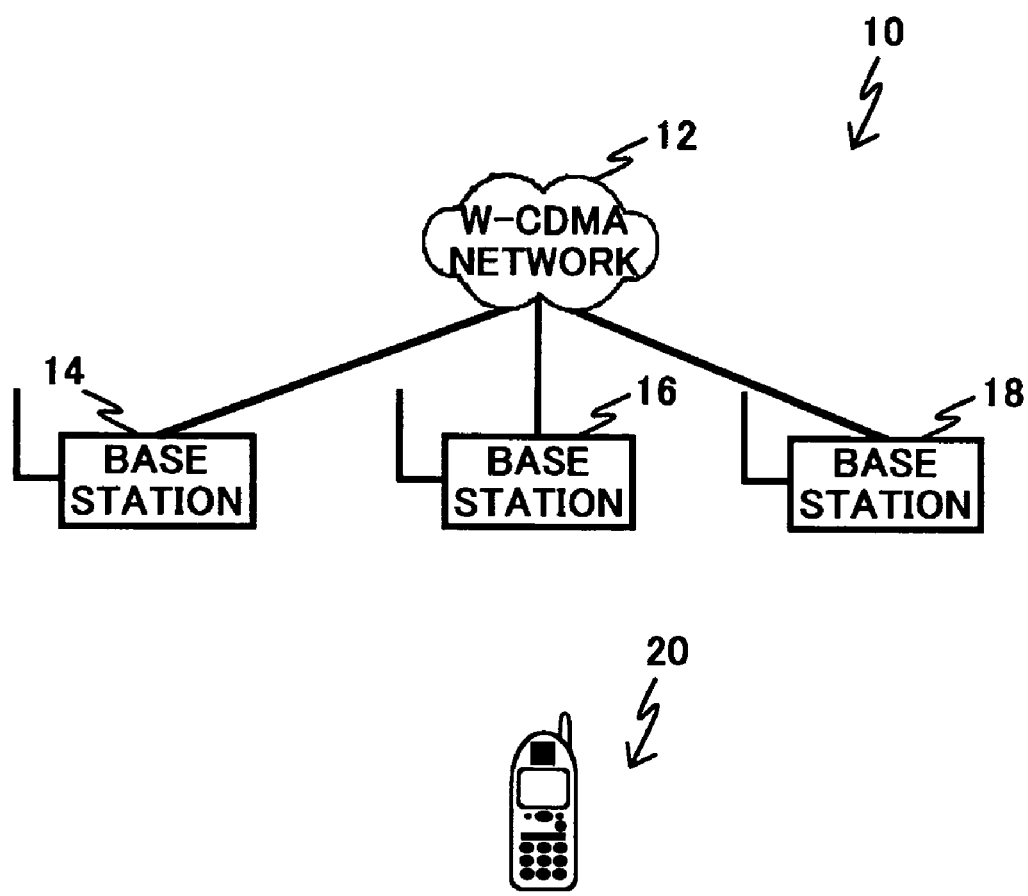
FIG. 2 is a schematic diagram illustrating a W-CDMA wireless communication systems.

Referring now to FIG. 2, there is shown generally a wireless communication system 10 including a W-CDMA network 12 and base station 14, 16 and 18. A mobile station 20 can receive a number of radio signals transmitted from cells served by the base stations 14 to 18 via multiple propagation paths. When the mobile station 20 performs a cell search, it receives a plurality of multi-path radio signals originating from the base stations 14 to 18, which are shifted in timing from each other due to signal reflection and diffraction.

Figure 3:
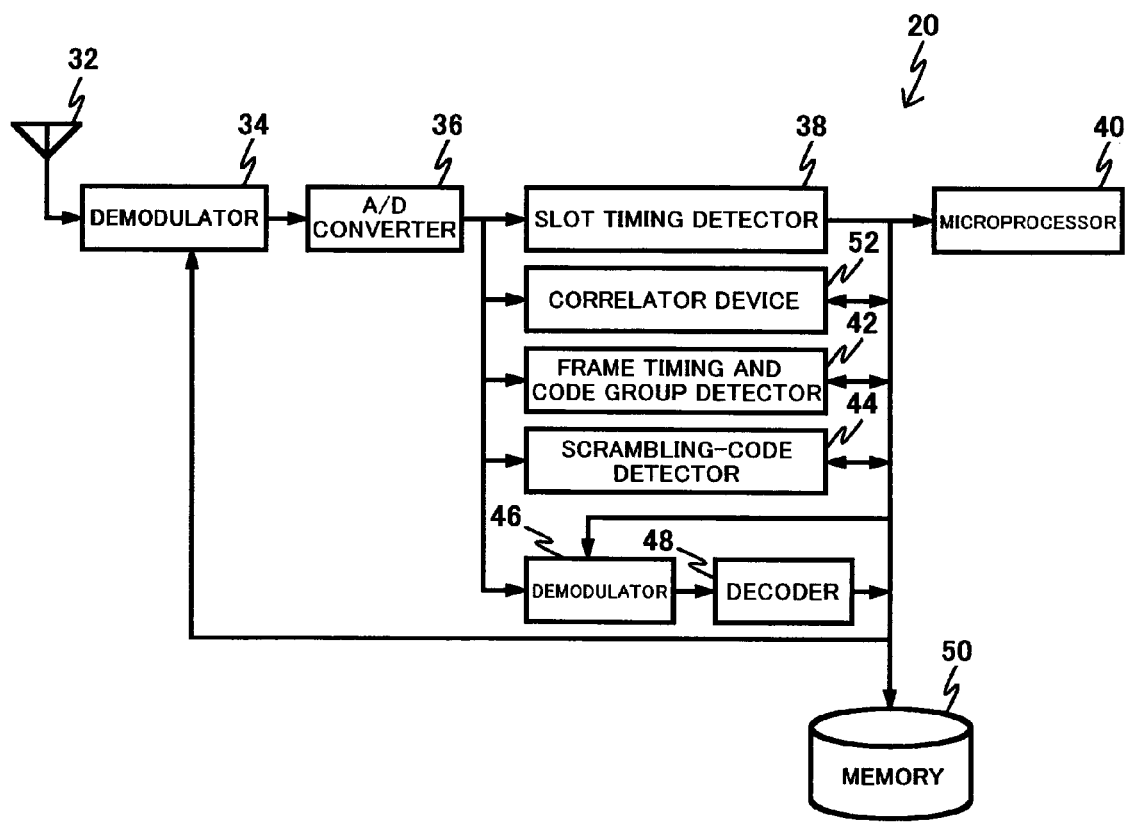
FIG. 3 is a schematic diagram of functional elements of a mobile station forming part of the wireless communication systems of FIG. 1.

FIG. 3 is a schematic diagram showing a schematic structure of the mobile station 20. This mobile station 29 includes an antenna 32, a demodulator for down converting the radio signals received by the antenna 32 to a base band frequency, and analogue to digital converter 36 which converts received analogue signals into digital signals, a slot timing detector 38 for detecting slot timing during cell search, a frame timing and code-group detector 42 which detects frame timing and code-group during cell search, a scrambling-code detector 44 which detects a scrambling-code during cell search and a demodulator 46 which demodulates a received code with detected spread codes.

The mobile station 29 also includes a decoder 48 which decodes the received signals demodulated by the demodulator 46, a microprocessor 40 which controls operation of the mobile station 20 and a memory 50 for storing a program to be executed by the microprocessor 40 as well as data required by the microprocessor 40 in the performance of its various operations. A dedicated correlator device 52 also forms part of the mobile station 20. The dedicated correlator device 52 performs quick Common Pilot Channel correlation between initial peak timing data from the first step of cell searching, and scrambling code and frame timing data based on previously identified cells from the from the second and third steps of cell searching.

The operation of the mobile station 20 in the performance of the cell search according to one embodiment of the present invention will now be described with reference to FIGS. 4 and 6. When the mobile station 20 repeatedly runs a cell search process, step one is followed with quick Common Pilot Channel correlation to identify peaks that belong to previously identified cells and reject those from further processing. The order of processing for a given step one peak is [step 1]-[reject known cells]-[step 2]-[step 3], as seen in FIG. 4.

Figure 4:
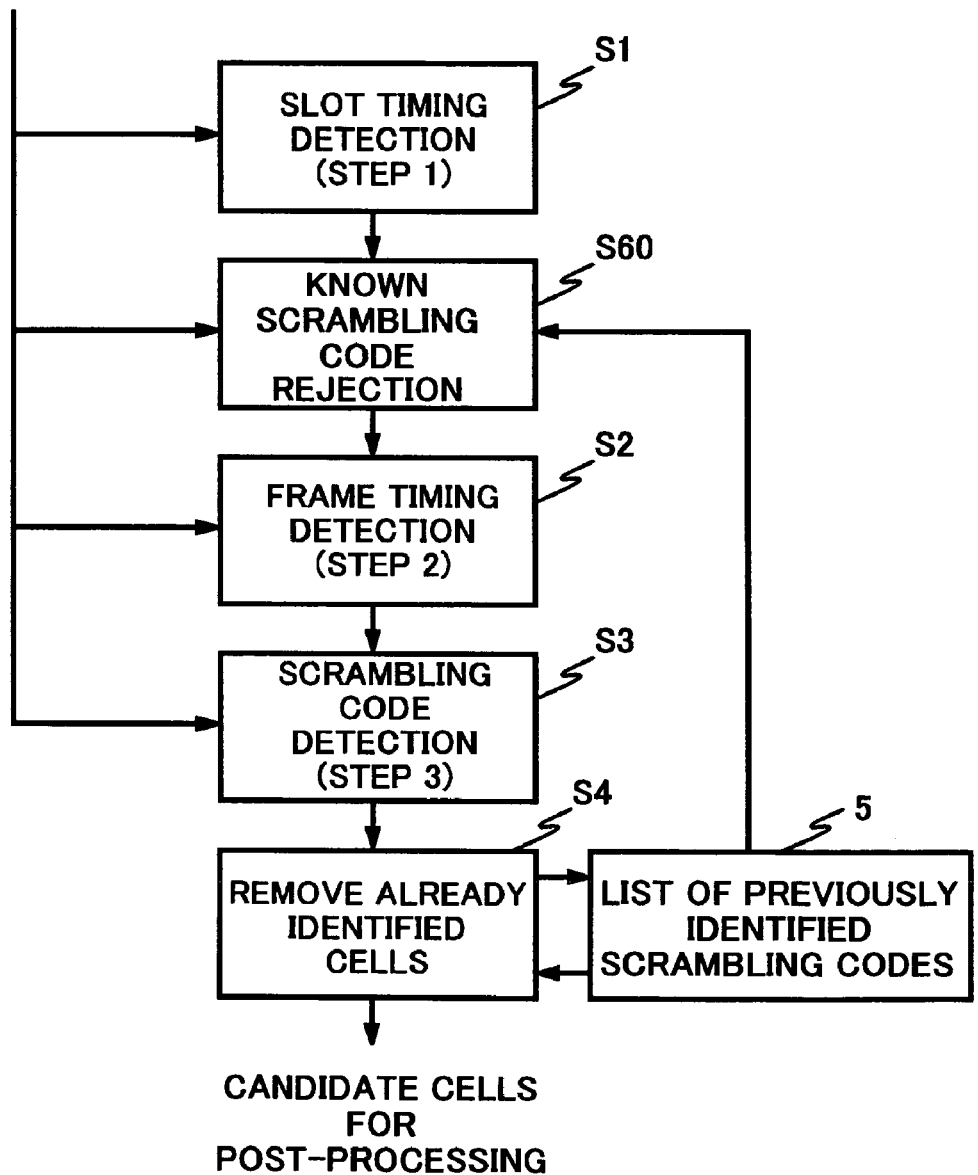
FIG. 4 is a flow chart illustrating the broad functional steps performed by the mobile station of FIG. 3 when carrying out a cell search in accordance with one embodiment of the present invention.
Figure 5:
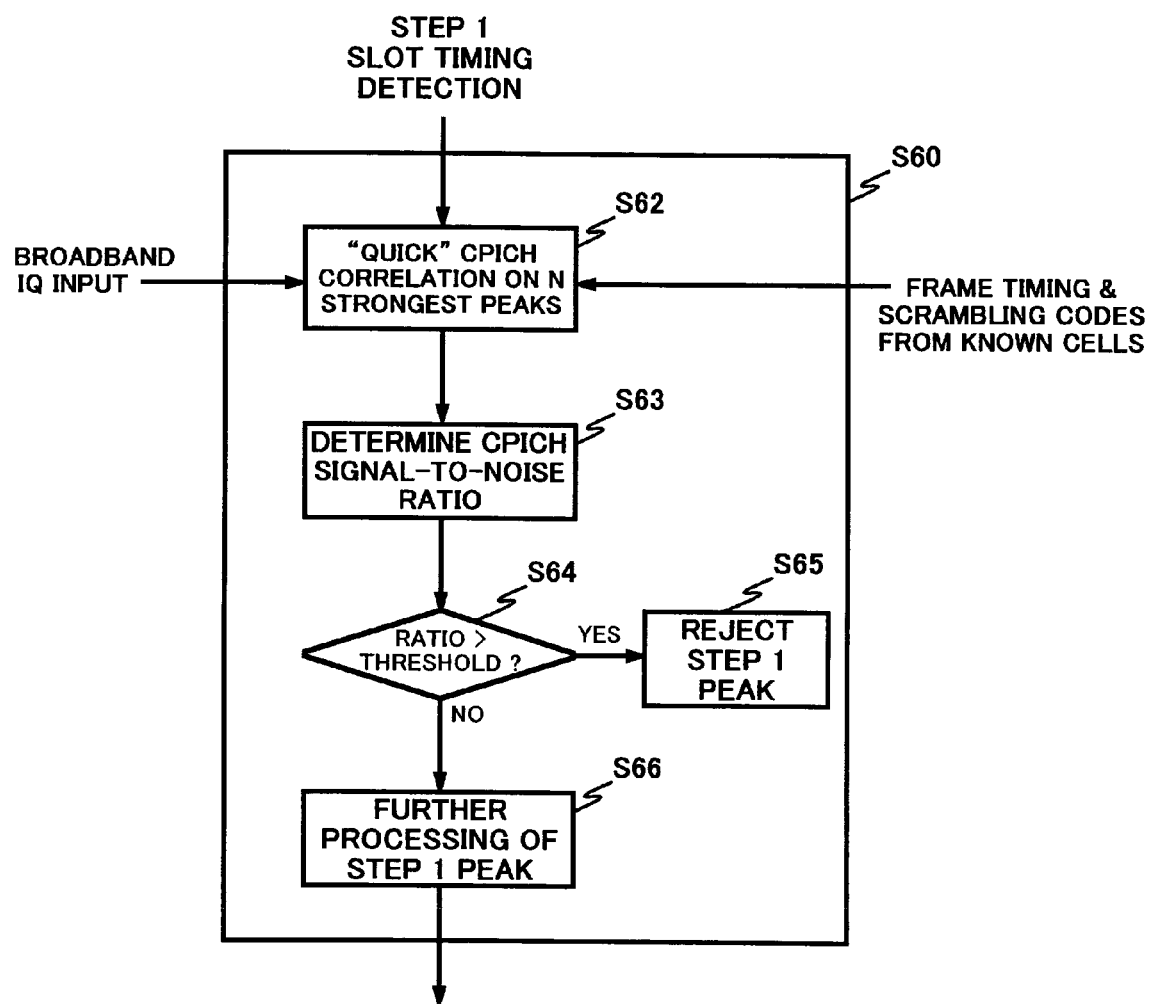
FIG. 5 is a flow chart illustrating in more detail the sub-steps carried out during the step of known scrambling code rejection forming part of the cell search process shown in FIG. 4.

The second step '[reject known cells]' referenced 60 in FIG. 4 is used to examine N strongest step one peaks to determine they belong to one of the already identified cells. As seen in FIG. 5, this is done by performing a quick correlation on the Common Pilot Channel at step 62 with initial slot timings from the latest step one peaks, but with scrambling code and frame timings based on already known cells. The resulting amplitude of the quick correlation is then divided by the average value from step one, giving a rough estimation of Common Pilot Channel signal to noise ratio at step 63. This ratio is then compared against a present threshold at step 64. High value of signal to noise ratio means that the known scrambling code has been detected and the given step one peak can be rejected at step 65. Otherwise, the detected step one peak is further processed, at step 66.

Figure 6:
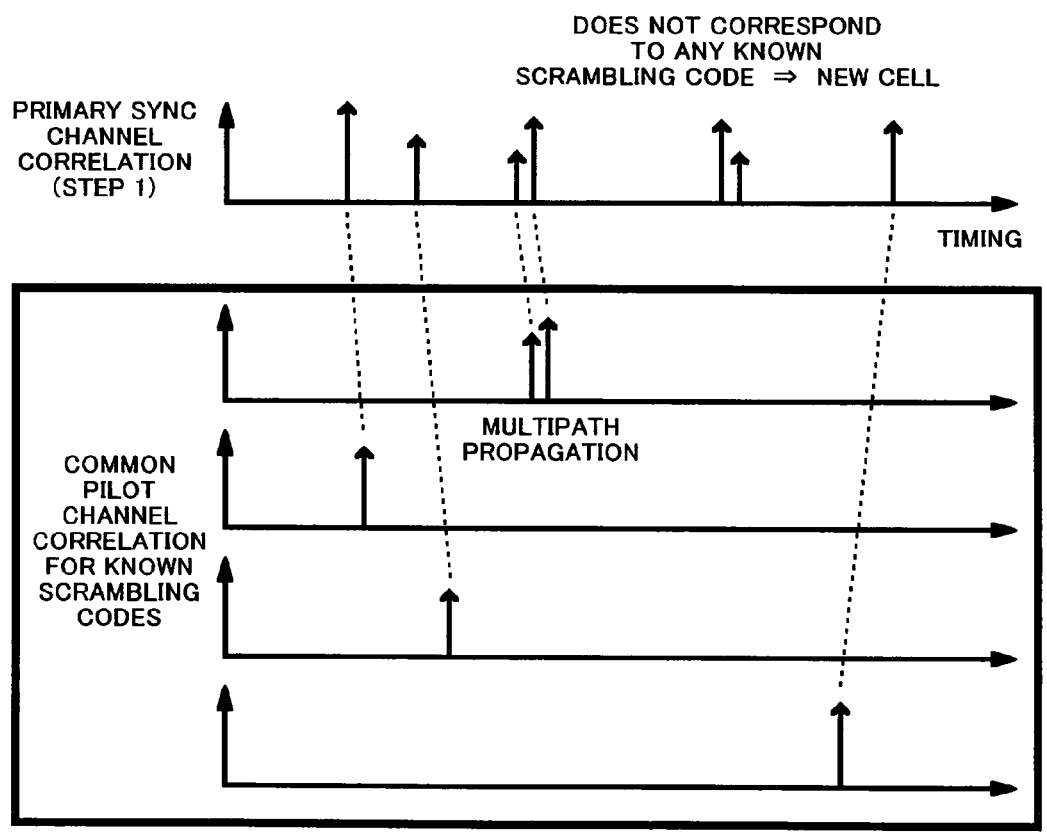
FIG. 6 is a graphical representation of the correlation of slot timings identified in the first step of the cell search process shown in FIG. 4 with the scrambling codes and frame timings previously identified in the second and third steps of that cell search process.

The arrangement of the candidate timings and scrambling codes during the known scrambling code rejection step is illustrated on FIG. 6. The purpose of the quick Common Pilot Channel correlation is to find which of the step one correlation peaks correspond to already known scrambling codes, and reject those from further processing. The corresponding peaks are shown with dashed lines on the diagram.

The quick Common Pilot Channel correlation could be performed with the same device that is otherwise used for (i) step three of cell search, or (ii) the device which is otherwise used for path profile measurement or, preferably (iii) with the dedicated correlator 52 shown in FIG. 3. The dedicated device may comprise of several individual correlators in parallel, each correlator setup for different scrambling code, thus detecting several already known scrambling codes in a single step.

Alternatively, the device 52 may comprise a matrix of correlators, where each row of correlators is setup for one known scrambling code. For each row in the matrix, several correlators (columns in the matrix) are setup for timing for several known multi-path reflections corresponding to the given scrambling code. Thus, the device detects several known scrambling codes and several known frame timing values for each scrambling code, in a single step.

To achieve the improvement in the overall average speed of detecting new cells, it is desirable that the quick correlation takes much shorter processing time than normal step two and step three of the cell search. The correlation could be run for as little as one WCDMA slot, i.e. 10 Common Pilot Channel symbols. Such a short accumulation period for the correlation does not have as much processing gain as is otherwise required for step three of cell search, but it is sufficient to detect the strongest cells. The performance of this processing step is not critical, because a failure to detect a cell in this step will not lead to cell search failure, only to the analysis of the peak for the second time, therefore regressing to the standard algorithm.

It is also preferable for the quick correlation that the list of step one peaks is processed within the same burst, i.e. the same compressed mode window or the same paging occasion, so that the cell rejection step is used to up-to-date slot timing from the step one peak.

The aspect that makes the described arrangement improve the overall speed of cell search is the fact that the quick correlation step runs for much shorter time than step two and step three. Some strong cells are rejected after the quick correlation step, and full step two and step three is only run on peaks that are more likely to belong to new cells, rather than on cells that have already been identified.

Advantageously, the step of rejecting know scrambling codes, i.e. the quick correlation, should only be performed on the known cells that have frame timing sufficiently close to the given step one peak. This would be achieved with pre-loading the above described matrix of correlators with timings from step one, that are sufficiently close to the timing of the know cells. This will improve overall speed of rejection, because it is very unlikely that the cell frame timing would move by a large amount between successive measurement windows, therefore the processing resource (the matrix of correlators) is not wasted one scrambling codes that are unlikely to be close to the given timing.

The arrangement described herein acts to increase the speed with which the mobile station progresses through step one peak detections, so that many step one peaks are analyzed as possible in a given time. The speed of the step one peak analysis is improved by using information from already identified cells.

It is to be understood that modifications or additions may be made to the above described preferred embodiment of the invention without departing from the spirit or ambit of the present invention.

The claims defining the invention are as follows:

1. A method of performing a continuous cell search for new cells in a wireless communication systems having a plurality of base stations and a mobile station, the method including the steps of:
    (a) using a primary synchronization code to acquire slot synchronization for identified cells;
    (b) using a secondary synchronization code to find frame synchronization and identify a code group of the identified cells;
    (c) determining a primary scrambling code used by the identified cells; and
    (d) rejecting cells corresponding to previously identified primary scrambling codes from post-processing,
    wherein the method further includes the steps of:
    (e) correlating slot timings identified in step (a) with frame timings corresponding to primary scrambling codes identified in previous runs of steps (b) and (c); and
    (f) rejecting slot timings identified in step (a) from further processing in steps (b) and (c) when correlation detected.

2. A method according to claim 1, wherein step (f) is performed on slot timings determined to have the strongest correlation in step (e).

3. A method according to claim 1, wherein the slot timings having the strongest correlation in step (e) are determined by dividing by strength of correlation of each slot timing by the average of all slot timings detected to derive a slot timing signal-to-noise ratio, and comparing the ratio to a predetermined threshold.

4. A method according to claim 3, wherein the signal-to-noise ratios exceeding the predetermined threshold are rejected in step (f).

5. A method according to claim 1, wherein the correlation performed in step (e) is performed over a limited number of W-CDMA slots.

6. A method according to claim 1, wherein the correlation performed in step (e) and the rejection of known slot timings in step (f) are performed within the same compressed mode window or paging occasion.

* * * * *